(No Model.)

J. SATTES.
SAW FILING MACHINE.

No. 364,442. Patented June 7, 1887.

WITNESSES:
Donn Twitchell
C Sedgwick

INVENTOR:
J. Sattes
BY
Munn & Co
ATTORNEYS.

UNITED STATES PATENT OFFICE.

JOHN SATTES, OF BUTTE CITY, MONTANA TERRITORY.

SAW-FILING MACHINE.

SPECIFICATION forming part of Letters Patent No. 364,442, dated June 7, 1887.

Application filed October 8, 1886. Serial No. 215,724. (No model.)

*To all whom it may concern:*

Be it known that I, JOHN SATTES, of Butte City, in the county of Silver Bow and the Territory of Montana, have invented a new and Improved Saw-Filing Machine, of which the following is a full, clear, and exact description.

This invention relates to the construction of a novel form of machine applicable for use in the filing of straight-edged saws, the object of the invention being to so arrange the several parts of the machine that each tooth of the saw will be evenly and accurately filed.

Reference is to be had to the accompanying drawings, forming a part of this specification, in which similar figures of reference indicate corresponding parts in all the views.

Figure 1:
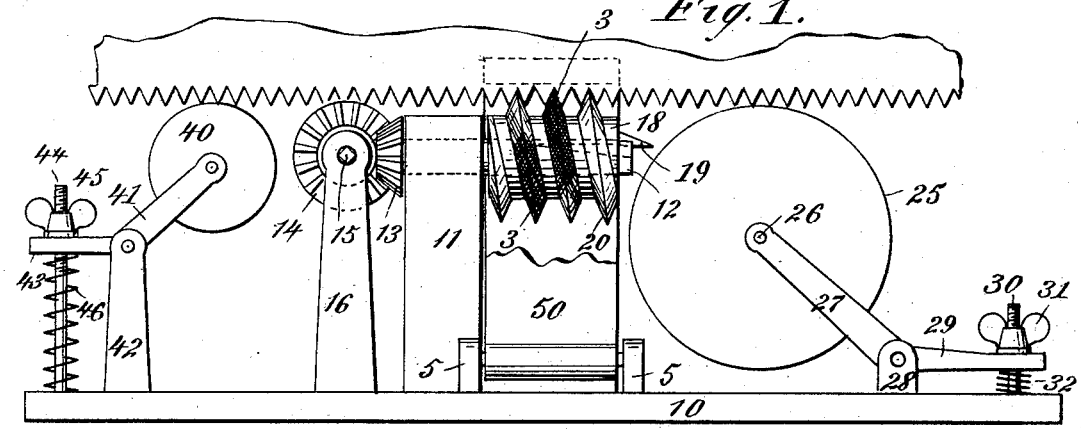
Figure 2:
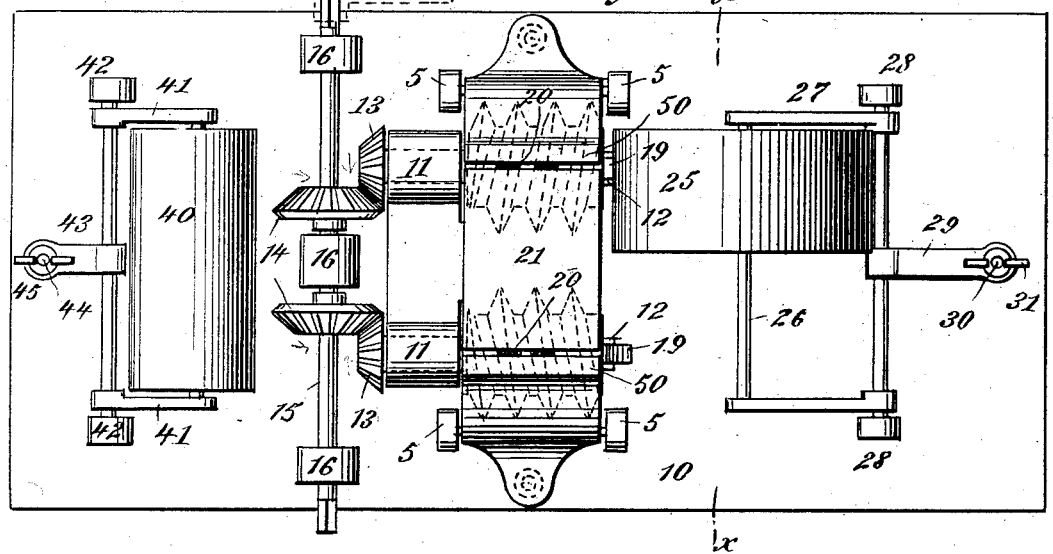
Figure 3:
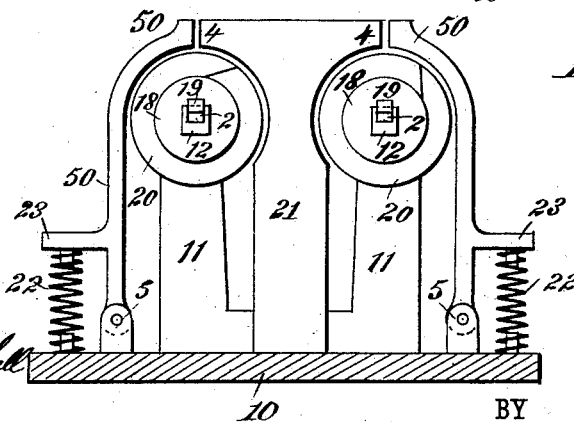

Figure 1 is a side view of my improved form of saw-filing machine, a portion of one of the movable clamps being removed in order that the construction of the file-cylinders may be more clearly illustrated. Fig. 2 is a plan view of the machine; and Fig. 3 is an end view, the base being shown in section taken on the line x x of Fig. 2.

In the drawings, 10 is a base-plate or bed, upon which there is mounted a double-armed standard, 11, the upper ends of the arms of this standard being apertured to receive the shanks of two mandrels, 12, said mandrels being arranged to carry bevel-gears 13, that are engaged by other gears, 14, carried by a cross-shaft, 15; or the gears 14 could be united in the form of a double-faced gear. The shaft 15 is supported by bearings 16, and the ends of the shaft are squared or irregularly formed to correspond with the socket of a crank-arm, as 17.

Upon each of the mandrels there is mounted a cylinder, 18, said cylinders being held to place by spring-catches 19, arranged to be depressed into recesses 2, formed in the ends of the mandrels, in order that the cylinders may be slid to place; but after the cylinders are in place upon the mandrels, which are squared or irregularly formed in order that the cylinders may be made to revolve therewith, the catches will spring upward and prevent the displacement of the cylinders. The cylinders 18 are provided with screw-threads 20, the central portions of which threads are formed with file-teeth 3, while the ends of the threads are uncut.

Between the two mandrels I arrange a post or standard, 21, the upper end of which is expanded so as to extend over the cylinders, forming fixed jaws 4, against which the saw is held by movable jaws 50, that are pivotally mounted in brackets 5, that are connected to the base-plate 10 and arranged to extend upward and over the cylinders, the jaws 50 being normally held against the jaws 4 by spiral springs 22, which are arranged beneath outwardly-extending arms 23, that are formed on the jaws 50.

Just beyond the unsupported end of the mandrels I mount a narrow roller, 25, said roller being loosely mounted upon a shaft, 26, that is carried by a frame, 27, said frame being pivotally mounted in brackets 28, and provided with an outwardly-extending arm, 29, that is apertured to receive a post, 30, the upper end of which is threaded to be engaged by a winged nut, 31, the arm 29 being held against the under face of the nut by a spiral spring, 32, the arrangement being such that the roller 25 may be adjusted as to height and may be moved from one end to the other of the shaft 26, the object of so moving the roller from end to end of its supporting-shaft being to provide for the removal of either of the cylinders 18.

A second roller, 40, is carried by a frame, 41, that is pivotally mounted in standards 42, this frame 41 being provided with an arm, 43, that is apertured to receive a shaft, 44, the upper end of which shaft is threaded and is engaged by a winged nut, 45, the arm being held against the under face of the nut by a spiral spring, 46, from which arrangement it will be seen that the height of the roller 40 may be adjusted as desired.

An inspection of Fig. 1 will show that the pitch of the thread 20 is double that of the teeth of the saw in connection with which the machine is to be employed, and an inspection of Fig. 2 will show that one of the threads 20 is a right-hand thread, while the other is a left-hand thread. The rollers 25 and 40 may be made of wood, rubber, soft metal, or any other proper material, whereby the weight of the saw will be supported without injuring the sharpened teeth of the saw.

In operation the saw is placed between one pair of jaws, so that its weight will rest upon the rollers 25 and 40, while the thread 20, a portion of which is formed with file-teeth, will enter every second recess between the saw-teeth. The operator holds the saw with one hand and with the other turns the shaft 15, thus imparting a rotary motion to the cylinders 18, and consequently to the spiral thread formed on said cylinders. As the cylinders are revolved the saw will be gradually drawn forward, the teeth being filed as the saw advances; but by forming a portion of the thread so that it shall be perfectly smooth and uncut, that portion will act as a gage to limit the depth of the cut made by the file-section of the thread.

After the saw has been advanced as described it is removed and placed in a similar manner between the other pair of jaws, the roller 25 being at this time moved to the opposite end of its shaft, and in this second operation of filing the other set of recesses will be entered by the threads upon the cylinders, and the second set of teeth will be sharpened.

As before stated, one of the threads 20 is a right-hand thread, while the other is a left-hand thread, and consequently it follows that in the sharpening of the saw the cut made by the file will be at a proper angle, care, of course, being taken that the saw is set so that the thread will enter the proper recesses between the teeth of the saw.

In such a machine as I have described it is necessary that special saws should have special file-cylinders; but such cylinders may be quickly and readily applied to the mandrels, and, as a usual thing, a single cylinder will last as long as a saw of the same relative pitch.

Having thus described my invention, what I claim as new, and desire to secure by Letters Patent, is—

1. A saw-sharpening machine having a revoluble cylinder provided with a screw-thread, a portion of the length of which is formed with file-teeth, while the remaining portion is plain or uncut, substantially as described.

2. A saw-sharpening machine having a revoluble cylinder provided with a screw-thread, the central portion of the length of which is formed with file-teeth, substantially as described.

3. In a saw-filing machine, the combination, with a spiral file and its support, of a mandrel upon which the file-support is mounted, a mandrel-revolving mechanism, saw-supporting rollers, and a fixed and a movable jaw, the two jaws constituting a guide for the saw, substantially as described.

4. In a saw-filing machine, the combination, with a cylinder and its spiral thread, a portion of which is formed with file-teeth, of a mandrel, a means for revolving the mandrel, adjustable rollers mounted at either end of the mandrel, a fixed jaw arranged above and mounted upon one side of the mandrel, and a movable jaw also arranged above but mounted upon the other side of the mandrel, substantially as described.

5. In a saw-filing machine, the combination, with a cylinder provided with a spiral thread, a portion of which is formed with file-teeth, of a mandrel, a means for revolving the mandrel, a roller mounted at either end of the mandrel, a fixed jaw arranged above and mounted upon one side of the mandrel, a movable jaw also arranged above but mounted upon the other side of the mandrel, and a spring arranged in connection with the movable jaw, substantially as described.

6. In a saw-filing machine, the combination, with a cylinder provided with a spiral thread, a portion of which is formed with file-teeth, of a mandrel, a means for revolving the mandrel, two saw-supporting rollers, one of which is mounted to slide upon its shaft, and a saw-guiding mechanism, substantially as described.

7. In a saw-filing machine, the combination, with a cylinder provided with a spiral thread, a portion of which is formed with file-teeth, of a mandrel, a means for revolving the mandrel, rollers mounted at either end of the mandrel, means for adjusting the rollers, and a saw-guiding mechanism, substantially as described.

8. In a saw-filing machine, the combination, with a shaft carrying gears 14, of mandrels 12, gears 13, carried by the mandrels, cylinders 18, mounted upon the mandrels and formed with spiral threads 20, portions of which are cut to form file-teeth, a standard, 21, having jaws 4, movable jaws 50, pivotally connected to the base-plate of the machine and having arms 23, spiral springs 22, arranged in connection with the arms 23, a roller, 25, mounted to slide upon its shaft, a frame, 27, supporting the shaft of the roller 25 and pivotally connected to the bed of the machine, an arm, 29, a threaded post, 30, a winged nut, 31, and a spiral spring, 32, and a roller, 40, supported by a frame that is pivotally and adjustably connected to the bed of the machine, substantially as described.

JOHN SATTES.

Witnesses:
C. P. BLAINE,
CALEB E. IRVINE.